US007505061B2

United States Patent
Jones et al.

(10) Patent No.: US 7,505,061 B2
(45) Date of Patent: Mar. 17, 2009

(54) AUTOSTEREOSCOPIC DISPLAY

(75) Inventors: Graham Roger Jones, Oxfordshire (GB); Adrian Marc Simon Jacobs, Oxford (GB); Grant Bourhill, Stow-on-the-Wold (GB); David James Montgomery, Oxfordshire (GB); Bronje Mary Musgrave, Abingdon (GB)

(73) Assignee: Sharp Kabushiki Kaisha, Osaka (JP)

( * ) Notice: Subject to any disclaimer, the term of this patent is extended or adjusted under 35 U.S.C. 154(b) by 900 days.

(21) Appl. No.: 10/615,816

(22) Filed: Jul. 9, 2003

(65) Prior Publication Data

US 2004/0012671 A1  Jan. 22, 2004

(30) Foreign Application Priority Data

Jul. 17, 2002  (GB)  ................. 0216608.0

(51) Int. Cl.
*H04N 13/04* (2006.01)
*H04N 15/00* (2006.01)

(52) U.S. Cl. .......................................... 348/51; 348/42

(58) Field of Classification Search .................. 348/51, 348/59, 42; 349/15; 359/24
See application file for complete search history.

(56) References Cited

U.S. PATENT DOCUMENTS

| | | | | |
|---|---|---|---|---|
| 5,696,552 A | * | 12/1997 | Aritake et al. ................. | 348/51 |
| 5,796,500 A | * | 8/1998 | Hart ............................ | 359/24 |
| 5,917,562 A | * | 6/1999 | Woodgate et al. ............. | 349/15 |
| 6,069,650 A | * | 5/2000 | Battersby ..................... | 348/59 |
| 6,094,216 A | * | 7/2000 | Taniguchi et al. ............. | 348/51 |
| 6,476,889 B2 | | 11/2002 | Urabe et al. | |

FOREIGN PATENT DOCUMENTS

| | | |
|---|---|---|
| EP | 0 829 744 A2 | 3/1998 |
| GB | 2 314 167 A | 12/1997 |
| JP | 2001-166289 | 6/2001 |
| KR | 2001-0062353 | 7/2001 |

OTHER PUBLICATIONS

European Search Report for corresponding Application No. 03102051.4 dated Dec. 13, 2004.
Korean Office Action for corresponding Application No. 519980961371 dated Apr. 7, 2006.

\* cited by examiner

*Primary Examiner*—Allen Wong
(74) *Attorney, Agent, or Firm*—Renner, Otto, Boisselle & Sklar LLP

(57) ABSTRACT

An autostereoscopic display comprises a pixellated transflective spatial light modulator which is arranged to provide a visual indication to an observer of the amount of crosstalk caused by reflection of ambient illumination. The display comprises a rear parallax barrier between a backlight and the modulator. Part of the barrier is formed as a screen blocking transmitted light from a first region of the modulator so that the pixels in this region are visible only by reflection of ambient illumination. In a second region, the pixels are illuminated with both transmitted and reflected light. A controller sets the pixels of the first region to maximum intensity and the pixels of the second region to a fraction of the maximum intensity. The fraction corresponds, for example, to a maximum amount of crosstalk which is permissible for autostereoscopic viewing. When the brightness of the first region is darker than or the same as the brightness of the second region, crosstalk is sufficiently low to permit autostereoscopic viewing.

47 Claims, 5 Drawing Sheets

_US 7,505,061 B2_

AUTOSTEREOSCOPIC DISPLAY

BACKGROUND OF THE INVENTION

The present invention relates to an autostereoscopic display.

Autostereoscopic displays are well-known and examples of such displays are disclosed in EP 0 602 934, EP 0 656 555, EP 0 708 351, EP 0 726 482, EP 0 829 743, EP 0 833 183 (equivalent to GB 2 317 710) and EP 0 860 728. EP 0 829 744 discloses an example of such a display which is switchable between an autostereoscopic mode and a two dimensional mode. An autostereoscopic display capable of providing crosstalk correction for removing or reducing the effects of crosstalk between left eye and right eye images is disclosed in EP 0 953 962. Such displays may, for example, be based on liquid crystal spatial light modulators comprising arrays of picture elements (pixels) which modulate a light source in accordance with image data representing at least two homologous images.

EP 0 833 183 and GB 2 317 710 discloses a parallax barrier embodied by a liquid crystal device for switching between a barrier mode and a clear mode. The barrier is associated with a spatial light modulator of transmissive type to form an autostereoscopic display which can be switched to a two dimensional full resolution mode.

Transflective displays which are capable of operating selectively in a transmissive mode or a reflective mode are also known. An example of a transflective liquid crystal display is disclosed in M. Kubo et al, "Development of advanced TFT with good legibility under any intensity of ambient light", Proceedings of Information Displays Workshop 1999, Sendai, Japan, pages 183 to 186.

FIG. 1 of the accompanying drawings illustrates a known type of display which is of the transmissive type and which may be operated in two dimensional (2D) and three dimensional (3D) modes. The display comprises a liquid crystal spatial light modulator (SLM) 1 providing an array of pixels such as 2. Colour filtering (not shown) is provided so that the pixels are arranged as groups of red, green and blue (RGB) pixels for displaying a full colour image. The pixels are also arranged as columns for displaying interleaved vertical strips of left (L) and right (R) images.

A backlight 3 is disposed behind the SLM 1 and directs light towards the SLM through a 2D/3D switching arrangement 4, a patterned retarder 5, and an input polariser 6 of the liquid crystal device (LCD) forming the SLM 1. Light transmitted through the SLM 1 passes through an output polariser 7.

In the 3D mode of operation, the switching arrangement 4 is configured as a polariser which supplies linearly polarised light to the patterned retarder 5. The retarder 5 comprises alternating region in the form of a first group of regions such as 8 which have no effect on the polarisation of the light passing therethrough and relatively narrow regions 9 which rotate the polarisation of the light passing therethrough by 90°. The polariser 6 is arranged to block light passing through the regions 8 and to transmit light passing through the regions 9 so that the combination of the retarder 5 and the polariser 6 forms a rear parallax barrier with slits corresponding to the regions 9.

The parallax barrier controls the direction of light passing through the pixels such that light passing through those pixels which display the left eye image forms a left eye viewing window at a predetermined viewing distance from the display whereas light passing through those pixels displaying a right eye image forms a right eye viewing window at the viewing distance.

When the display is switched to the 2D mode of operation, the switching arrangement 4 is arranged not to polarise the light from the backlight 3. The structure of the patterned retarder 5 is required to be invisible and light from the backlight 3 passes through the pixels in all directions to provide a wide viewing angle. The SLM 1 is controlled to display a 2D image.

FIG. 2 of the accompanying drawings illustrates a typical example of a transflective display which may be used in an autostereoscopic display of the type shown in FIG. 1. The display is based on a liquid crystal device having a liquid crystal layer 10 and red, green, and blue colour filters 11. A microreflective structure 12 is provided for the reflective mode of operation whereas a backlight 13 is provided for the transmissive mode of operation. Polarisers/retarders are provided as shown at 14 and 15.

When a transflective display, for example of the type shown in FIG. 2, is used in a rear parallax barrier autostereoscopic display, for example of the type shown in FIG. 1, the display may be used in the autostereoscopic mode only in the transmissive mode of the SLM. In particular, the left and right eye viewing windows are produced only by light transmitted from the backlight through the parallax barrier structure. However, in many viewing conditions, ambient light is reflected to the eyes of an observer from the display so that an observer sees a mixture of light transmitted from the backlight through the SLM and ambient light modulated by the SLM and reflected, for example, by the microreflective structure 12 shown in FIG. 2. Whereas transmitted light modulated by the left and right eye images is seen substantially only by the left and right eyes, respectively, of the observer, reflected light is seen by both eyes of the observer and this may contribute greatly to image crosstalk which degrades the 3D effect. For example, if the reflected brightness is 10% of the transmitted brightness, this adds approximately 10% of crosstalk. Thus, in order to provide the best 3D viewing conditions during the autostereoscopic 3D mode of operation, the brightness of the reflected ambient light should be small compared with the transmitted light. Conversely, when the reflected ambient light is excessive, the resulting image crosstalk greatly degrades the 3D effect to the point where 3D operation is ineffective. This may result in visual stress to the observer.

SUMMARY OF THE INVENTION

According to a first aspect of the invention, there is provided an autostereoscopic display comprising a pixellated spatial light modulator and a backlight, characterised in that the modulator comprises a transflective modulator and characterised by comprising: an arrangement for substantially preventing transmission of light through at least one first region of the modulator to an autostereoscopic viewing region of the display; and a controller for setting at least some of the pixels of the at least one first region to a first predetermined transmissivity and for setting at least some of the pixels of at least one second region of the modulator to a second predetermined transmissivity less than the first transmissivity.

The arrangement may comprise a screen for substantially preventing the transmission of light from the backlight through the at least one first region.

The arrangement may comprise a first portion of the backlight disposed behind the at least one first region and switchable off independently of a second portion of the backlight disposed behind the at least one second region.

According to a second aspect of the invention, there is provided an autostereoscopic display comprising a pixellated spatial light modulator and a backlight, characterised in that the modulator comprises a transflective modulator and characterised by comprising a controller for alternately selecting first and second phases of operation, wherein, during the first phase, the controller sets at least some of the pixels of at least one first region of the modulator to a first transmissivity and sets the backlight to supply light of a first intensity through at least some of the at least some pixels of the at least one first region, and wherein, during the second phase, the controller sets at least some of the pixels of at least one second region of the modulator to a second transmissivity less than the first transmissivity and sets the backlight to supply light of a second intensity greater than the first intensity through at least some of the at least some pixels of the at least one second region.

The at least one first region may at least partially overlap the at least one second region. Each of the at least one first region and the at least one second region may comprise substantially the whole display area of the modulator.

The controller may be arranged to switch automatically between the first and second phases.

The display may comprise a first manually operable control for switching between the first and second phases.

The display may comprise a parallax element between the modulator and the backlight. The parallax element may comprise a parallax barrier. The screen may comprise part of the parallax element.

The first transmissivity may be substantially equal to the maximum transmissivity of the pixels.

The at least one second region may comprise a plurality of second regions. The controller may be arranged to set the pixels of the different second regions to different second transmissivities.

The controller may be arranged to set the pixels of the at least one second region to any one of a plurality of second transmissivities.

The pixels of each second transmissivity may form a pattern providing a visual representation of a crosstalk value corresponding to the second transmissivity.

The display may comprise a second manually operable control for selecting any one of the second transmissivities. The controller may be arranged to provide a or the crosstalk value corresponding to the selected second transmissivity. The controller may be arranged to perform crosstalk correction of autostereoscopic image data for the modulator in accordance with the crosstalk value.

The display may have a two dimensional operational mode. The controller may be arranged to switch to the two dimensional mode when the crosstalk value exceeds a predetermined threshold.

The at least some pixels of the first and second regions may be of the same colour.

The modulator may comprise a liquid crystal device.

It is thus possible to provide an arrangement which allows the ambient reflected light and the image crosstalk to be assessed. This may be used to indicate to an observer of the display when the ambient illumination has reached an undesirable level. This information may be used to provide crosstalk correction for the current level of crosstalk. Alternatively, if an undesirable level of crosstalk is indicated, the display may be switched out of the autostereoscopic mode, for example to a 2D mode where crosstalk is irrelevant. It is unnecessary to assess ambient reflected light and crosstalk in such a 2D mode so the display need not give any indication during the 2D mode.

BRIEF DESCRIPTION OF THE DRAWINGS

The invention will be further described, by way of example, with reference to the accompanying drawings, in which.

DETAILED DESCRIPTION OF PREFERRED EMBODIMENTS

Figure 3:
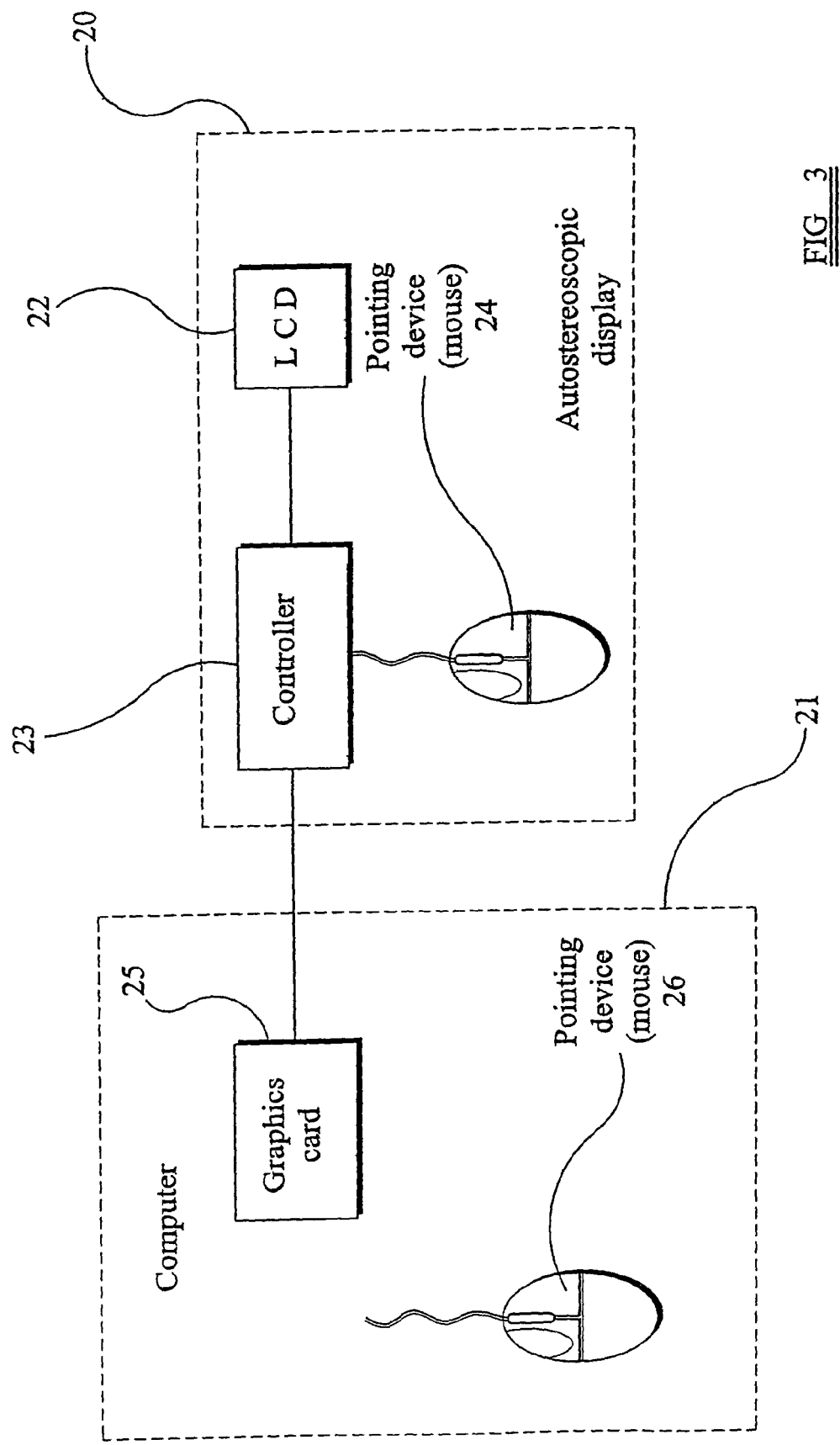
FIG. 3 is a block schematic diagram illustrating an autostereoscopic display constituting an embodiment of the invention.

FIG. 3 shows an autostereoscopic display 20 connected to a computer 21 for supplying 2D and 3D image data to be displayed by the display 20. The display 20 comprises a liquid crystal device 22 of the transflective rear parallax barrier type. The LCD 22 is connected to a controller 23 which has a manually operable control in the form of a pointing device such as a computer mouse 24. The controller 23 receives the image data from a graphics interface or card 25 of the computer, which also has a pointing device in the form of a mouse 26.

Although FIG. 3 illustrates the display 20 as being separate from the computer 21, the display may be incorporated within a computer with the computer acting as the controller 23 so that the mouse 24 is not then required. Alternatively, the display may not be connected to a computer but may operate independently or be connected to equipment other than a computer.

The computer 21 supplies the image data to the display and may generate the image data Alternatively or additionally, image data from a digital 3D camera or the like may be supplied to the computer 21, which then processes the data as necessary and supplies it to the display 20. The computer 21 also provides image and control data so as to cooperate with the LCD 22 to provide a graphical user interface for cooperating with the mouse 24 and/or the mouse 26.

Figure 1:
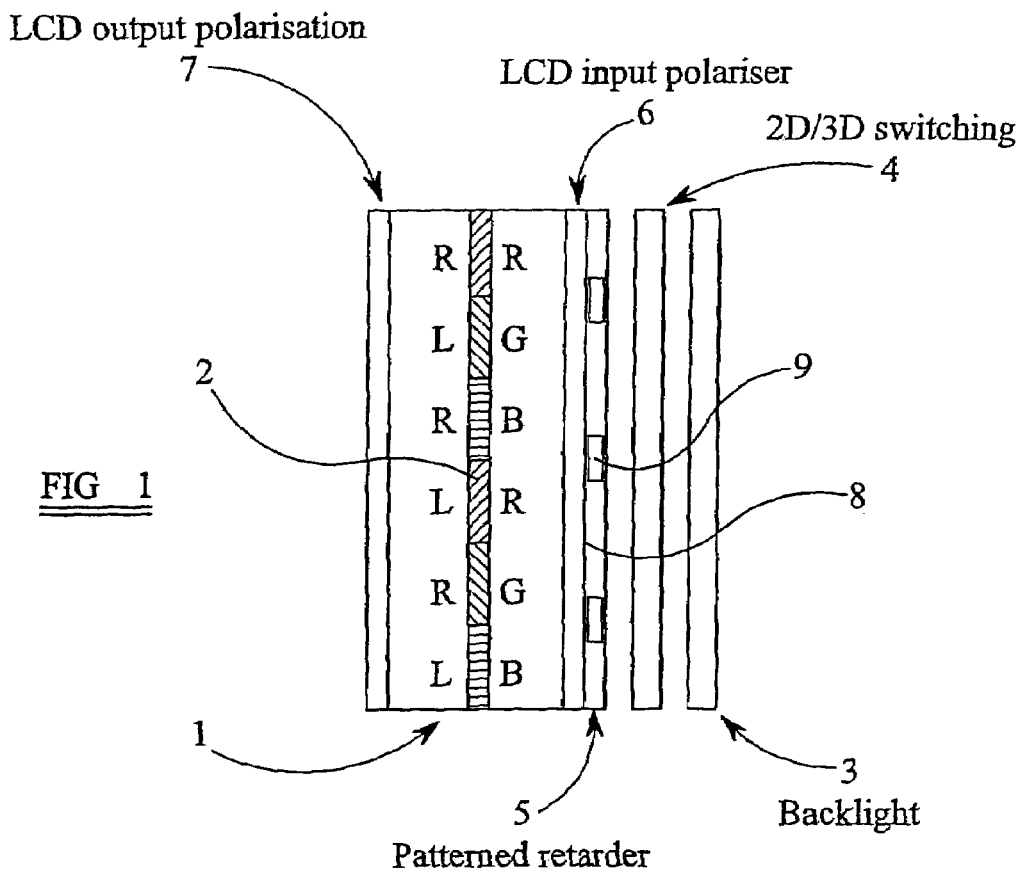
FIG. 1 is a cross sectional diagram illustrating a known type of rear parallax barrier autostereoscopic display.
Figure 2:
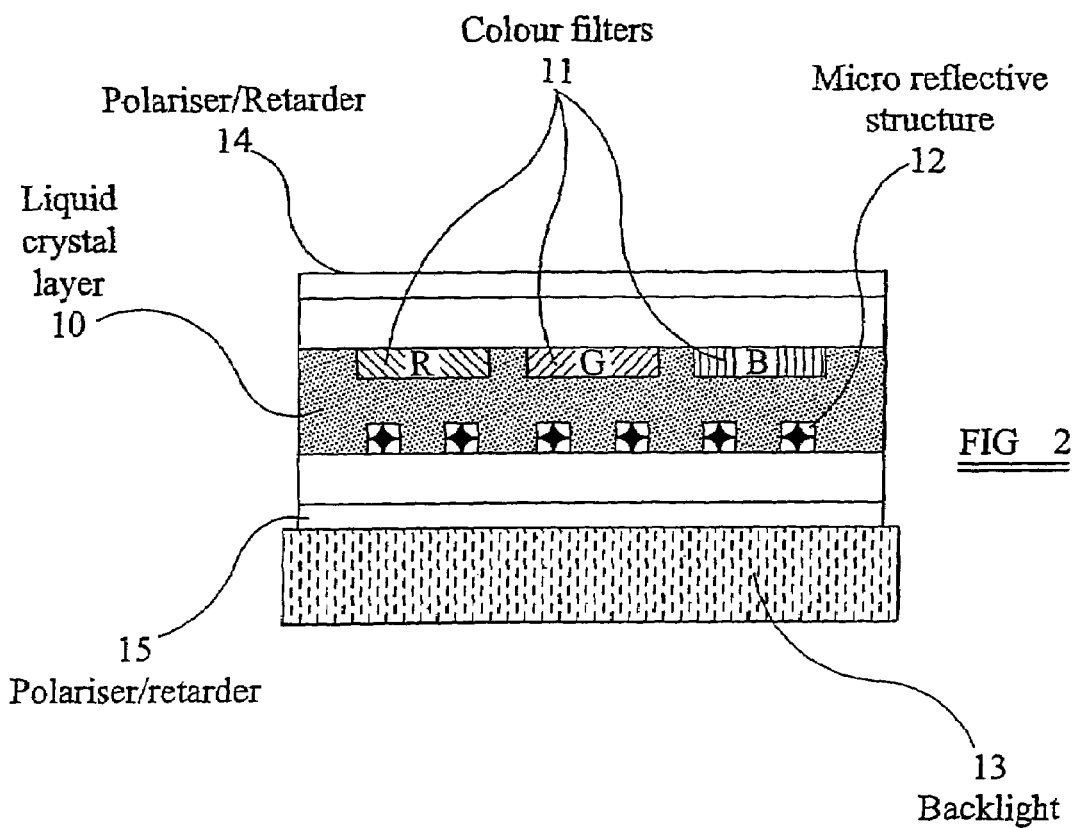
FIG. 2 is a cross sectional diagram illustrating a known type of transflective liquid crystal display.
Figure 4:
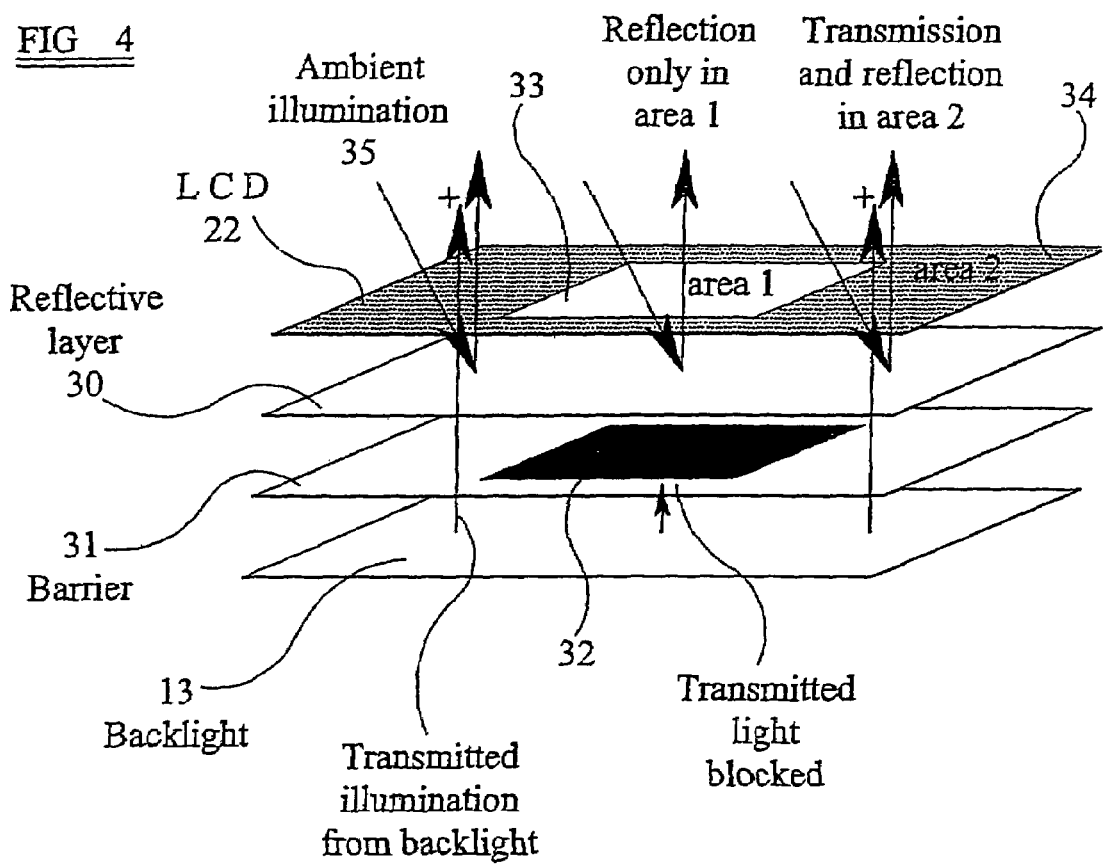
FIG. 4 is a diagram illustrating a transflective display panel of the display of FIG. 3.

An example of the LCD 22 is illustrated diagrammatically in FIG. 4 and may be of the type illustrated in FIG. 2 having a microreflective structure in the form of a reflective layer 30. The rear parallax barrier is shown at 31 and the backlight is shown at 13.

The parallax barrier 31 comprises transparent elongate slits which are arranged parallel to each other and evenly spaced. However, the barrier 31 has a region 32 forming an opaque screen which blocks the transmission of light from the backlight 13 through a first region 33 ("area one") of the LCD 22. The first region 33 is surrounded by a second region 34 ("area two") which is not screened from light from the backlight 13.

Thus, ambient illumination 35 from the front of the LCD 22 is reflected by the reflective layer 30 through both the first region 33 and the second region 34 whereas transmitted illumination from the backlight 13 passes through the second region 34 but is blocked by the screen 32 and does not pass through the first region 33.

In an alternative embodiment, the backlight has a first portion behind the first region 33 which can be switched off independently of a second portion of the backlight behind the second region 34. The opaque screen 32 is thus not necessary and may be omitted.

In order to provide an indication of the level of ambient reflected light and hence of crosstalk which would affect the transmissive autostereoscopic 3D mode of operation of the display, the pixels of the LCD 22 in the first region 33 are set by the controller 23 to maximum transmissivity. For example, in the case of a colour display having red, green and blue pixels, the pixels of one colour such as red are set to maximum intensity whereas the green and blue pixels are set to minimum intensity or transmissivity. The green and blue pixels in the second region 34 are set by the controller 23 to minimum transmissivity whereas the red pixels in the second region 34 are set by the controller 23 to a fraction A of maximum transmissivity.

The intensity of ambient light reflected through the first region 33 is represented by R whereas the total reflected and transmitted intensity from the second region 34 is given by (T+R)A, where T represents the transmitted intensity through the region 34. Thus, when the light intensity from the first region 33 is equal to that from the second region 34, the following condition applies:

$$R=A(T+R)$$

Which may be rewritten as:

$$A = \frac{\frac{R}{T}}{\left(\frac{R}{T}+1\right)}$$

The value of A represents the fractional intensity or transmissivity for the second region 34 such that the first and second regions appear to have the same intensity when the reflected light is equal to a certain proportion of the transmitted light (R/T). The level of crosstalk added by the reflected light is also given by A. When the display is operating in the autostereoscopic 3D mode, reflected light adds to the intensity of the correct image seen by each eye but also induces crosstalk because the reflected light is visible to each eye from pixels displaying an image intended for the other eye.

Figure 5:
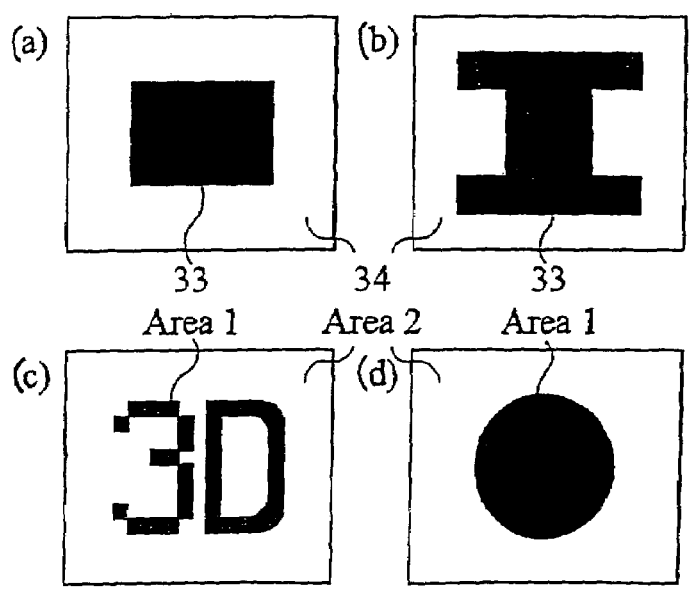
FIG. 5 illustrates examples of different shapes of brightness indicators.

FIG. 5 illustrates four examples of appearances of the first and second regions. An observer has to assess whether the amount of reflected ambient light is problematic so that these regions are arranged to provide a clear indication. The shapes illustrated at (a), (b) and (d) are in the form of "icons" and do not in themselves have any particular meaning. However, they do permit a clear assessment of the prevailing conditions to be made by the observer. The shape illustrated at (c) is in the form of text characters "3D" and indicates that the display is in the 3D operating mode. As a further alternative, the shape may be in the form of a number, which may, for example, represent the value of the fractional intensity A and hence the value of crosstalk which would be present in the transmissive autostereoscopic 3D mode of operation.

Figure 6:
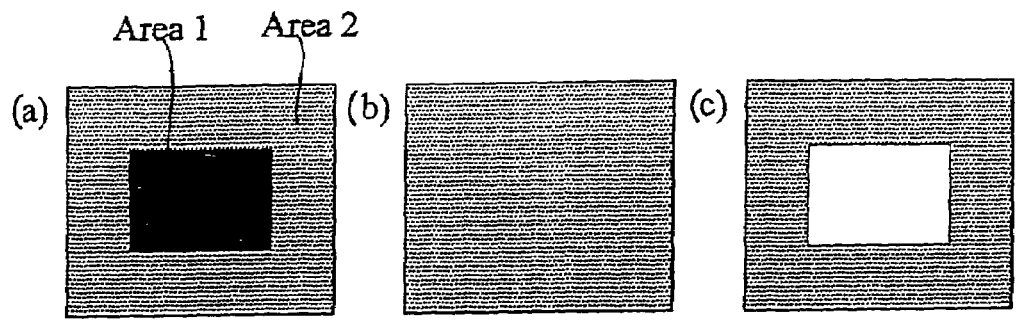
FIG. 6 illustrates the appearance of a brightness indicator for different levels of ambient illumination.

FIG. 6 illustrates diagrammatically how the regions would appear depending on the amount of ambient light being reflected from the display. The icon shown at FIG. 5(a) is illustrated for three different conditions of ambient lighting. At FIG. 6(a), area one appears darker than area two to the observer. If the fractional intensity A has been set to represent the maximum amount of crosstalk which can be accepted during autostereoscopic viewing, then this appearance would signify to the observer that the display can continue to be used in the autostereoscopic 3D mode. FIG. 6(b) illustrates the condition in which first and second regions have the same appearance i.e. have the same lighting intensity. When the first and second regions appear like this to the observer, the amount of reflected ambient light is at the limit for autostereoscopic viewing of the display.

FIG. 6(c) illustrates the condition in which the first region appears brighter than the second region and this corresponds to a relatively large amount of reflected ambient light. This appearance indicates that the amount of crosstalk caused by the reflected ambient illumination is unacceptably high and the display should not therefore be used in the autostereoscopic mode.

The display may merely provide indications to an observer as to the present viewing conditions with regard to the level of reflected ambient light and the level of crosstalk which would occur during autostereoscopic use. It may then be left to the observer to decide whether to stop using the display or switch the display to a non-autostereoscopic mode, such as a transmissive or reflective 2D mode of operation. For example, as a result of observing the appearance of the first and second regions, the observer may use the mouse 24 or 26 to interact with the graphical user interface so as to change the mode of operation. A manually operable button may be provided for changing between display modes and this may carry or be adjacent a label having the same appearance as the first region so as to guide a user towards operating the button when the operating mode should be changed. For example, the label may have the same pattern as the first and second regions. In a specific example, the indicator region may have the pattern shown in FIG. 5(c) and the label would then have the same pattern. The label would also have the same colours as the indicator area either when the indicator shows a good state or when the indicator shows a bad state.

If the colours of the label are the same as the indicator when a good condition is shown, then a user would use the button to revert to the 2D mode when the indicator and label differ. Alternatively, if the colours of the label are the same as the indicator when a bad condition is shown, then the user would use the button to revert to the 2D mode when the indicator and label are the same. Alternatively, the observer may have further interaction with the display as described hereinafter.

Figure 7:
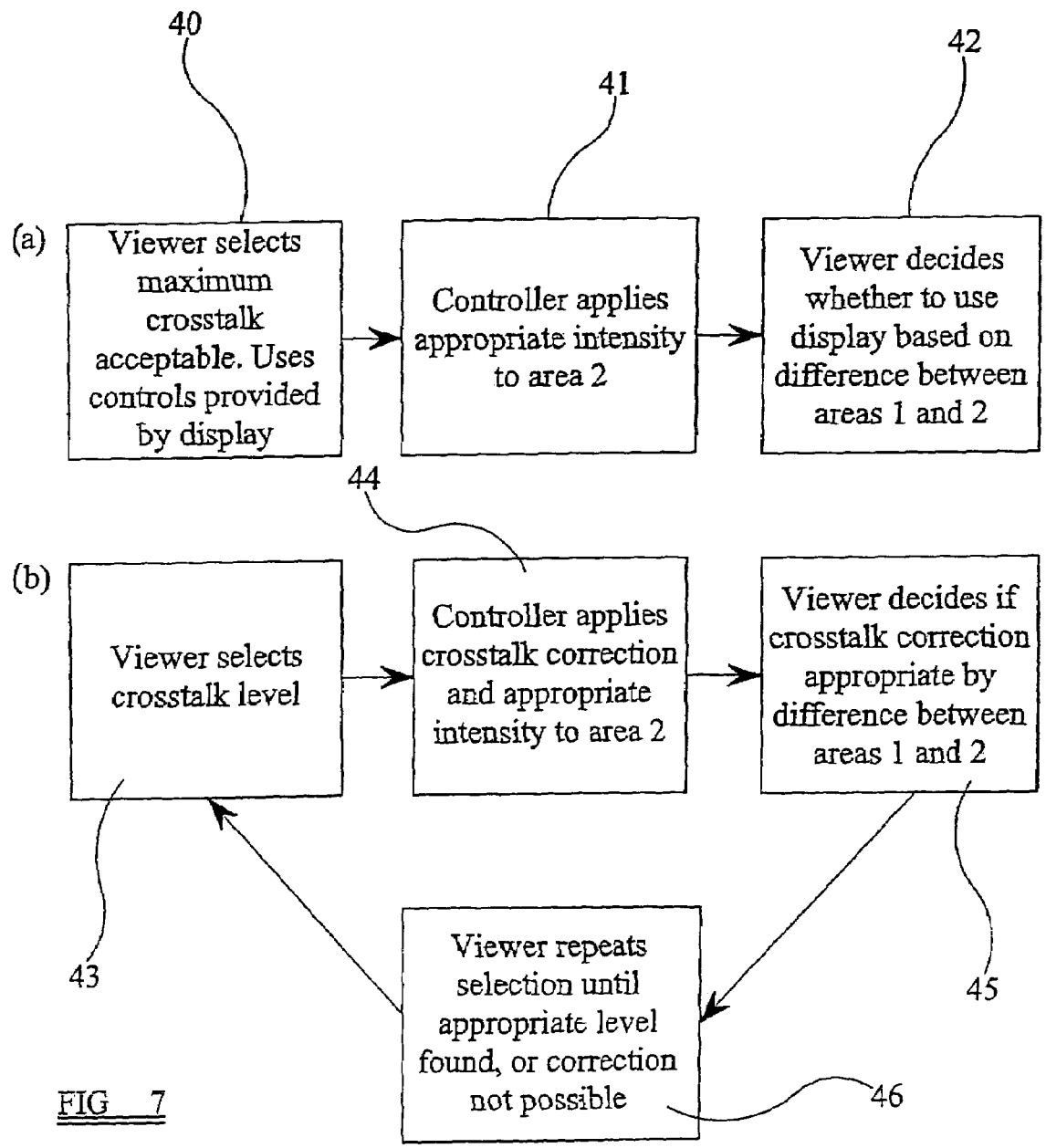
FIG. 7 illustrates as flow diagrams two different modes of operating the display of FIG. 3.

FIG. 7 illustrates two ways in which the display may be operated according to the ambient lighting conditions. In FIG. 7(a) a "passive" interaction is illustrated whereby, at 40, the observer or viewer selects the maximum crosstalk which is acceptable for autostereoscopic viewing. For example, the observer uses controls provided by the graphical user interface of the display, perhaps also using a keyboard (not shown), to set the maximum value of crosstalk as a percentage. The controller 23 then applies the appropriate intensity value A to the pixels of the second region 34 as shown at 41 and, as shown at 42, the observer decides whether to use the display in the autostereoscopic mode in accordance with the appearances of the first and second regions, as described hereinbefore. The step 40 may be varied, for example such that the controller 23 determines the value of T/R on the basis of a choice made by the manufacturer. Alternatively, the step 40 may be performed such that the observer cycles through different selections and indicates a choice to the controller 23, for example using the mouse 24.

A further possibility is that there is a plurality of first and second regions arranged to appear at different positions on the display, for example configured as different icons or as different numbers representing possible selections of maximum crosstalk values. The observer judges which "indicator" is such that the first and second regions have the same or closest brightnesses and may use the mouse 24 or 26 to point to and select the appropriate icon or crosstalk value if further interaction with the display is then possible. As a further alternative, the second region 34 may be arranged in the form of a scale representing a range of crosstalk values which appears as discrete values or substantially continuous values. The observer can judge which part of the scale is closest in brightness to an adjacent part of the first region and either make a decision shown at 42 or use the mouse to indicate the current value of crosstalk to the display.

FIG. 7(b) illustrates an alternative technique in which crosstalk correction is applied provided the level of crosstalk indicated to the display is less than a maximum threshold value. At 43, the observer indicates to the display by means of the mouse 24 or 26 or by any other manually operable control the current level of crosstalk caused by the prevailing ambient illumination. At 44, the controller 23 applies crosstalk correction by processing the image data supplied from the computer 21, for example in accordance with the crosstalk correction technique disclosed in EP 0 953 962. At the same time, the controller applies the appropriate intensity A to the second region 34 corresponding to the selected crosstalk level.

At 45, the observer decides from the appearance of the first and second regions whether the crosstalk correction provided by the controller 23 is appropriate for the prevailing conditions. If the correction is not appropriate, the selection of the crosstalk level is repeated at 46 and a reassessment made until the appropriate crosstalk correction is achieved or it is found that correction cannot be achieved, for example because the crosstalk is excessive. The upper limit on the amount of correction which may be applied may be dependent on the image or may be set in the design of the display, for example depending on the crosstalk correction technique actually used.

In an alternative mode of operation, the parameter A may be set to a value smaller than the maximum ambient brightness level and, instead of setting the pixels in the first region 33 to full brightness, they may be set to a brightness or transmissivity in accordance with an attenuating factor or parameter B. The parameter B may then be adjusted until the first and second regions appear to match in brightness to the observer. When the regions appear to be of the same brightness, the following condition applies:

$BR = A(T+R)$

Which may be rewritten as:

$$\frac{A}{B} = \frac{\frac{R}{T}}{\left(\frac{R}{T}+1\right)}$$

The crosstalk value is then given by the value of A/B.

The "brightness" indicator formed by the first and second regions may be located within the area of a display providing a visual position indicator of the type disclosed in EP 0 860 728. Such a visual position indicator is used by an observer to indicate whether he or she is at a correct position with respect to the display in order to have autostereoscopic viewing of the images displayed by the display. The visual position indicator occupies a region which is visible to the observer and provides an indication which, when the observer is correctly positioned, is effectively invisible to the observer. The indication only becomes visible when the observer is in an incorrect viewing position, for example giving rise to pseudoscopic viewing. Such an indicator does not therefore direct light to the normal viewing position for autostereoscopic viewing but may be used to provide brightness indication.

Figure 8:
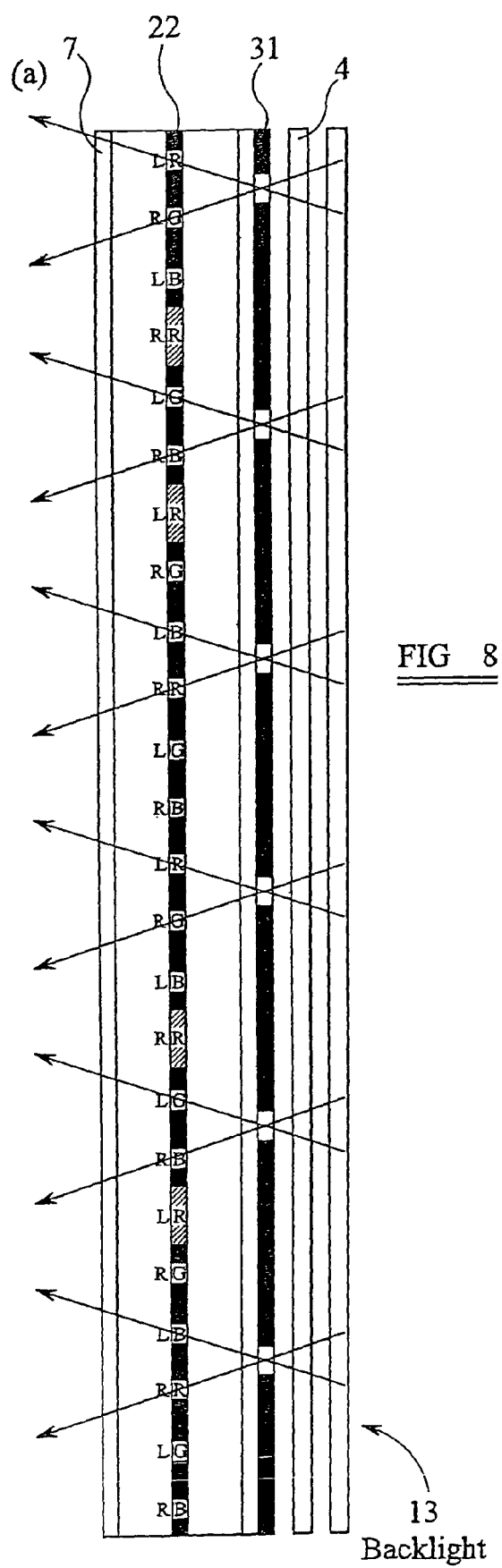
FIG. 8 illustrates as cross-sectional diagrams a brightness indicator formed within a visual position indicator.
Figure 8:
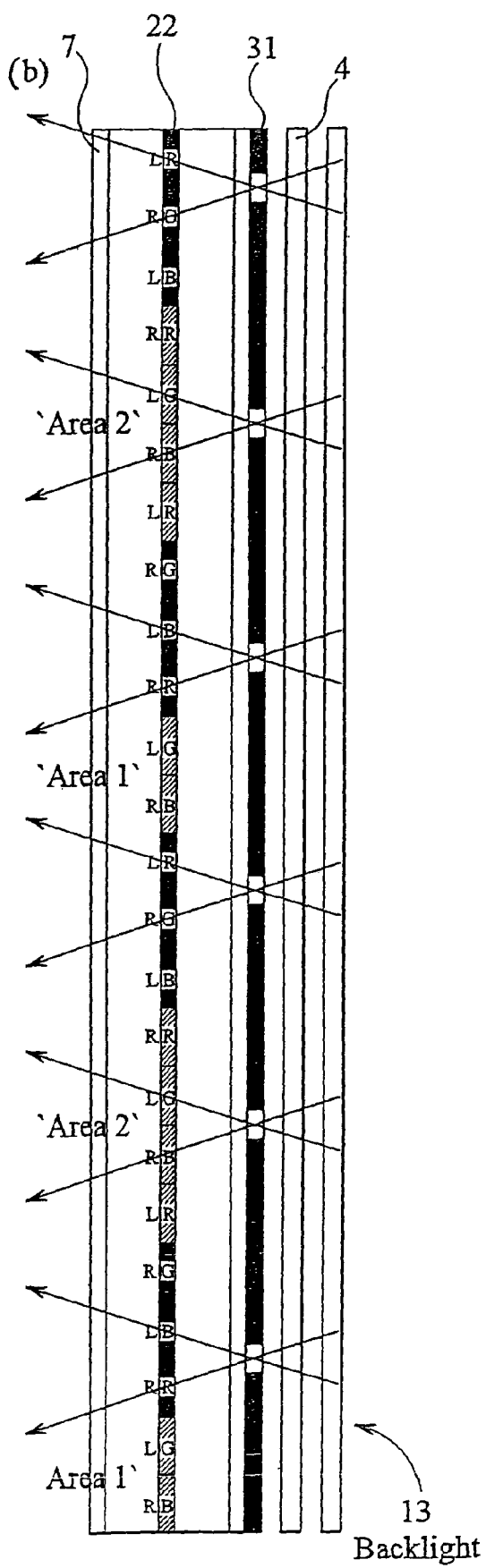

As shown in FIG. 8, only the red pixels in the visual position indicator area are used to provide position indication. However, the structure of the display is such that other colour pixels may be viewed through the visual position indicator region of the barrier as illustrated in FIG. 8(a). Assuming that the visual position indicator makes use of the red pixels, some or all of the blue and green pixels may be lit with the brightness attenuating factor A to form the regions indicated in FIG. 8(b) as "area two". Those pixels identified as "area one" in FIG. 8(b) are lit with full brightness. The "area two" pixels receive transmitted light through corresponding slits of the parallax barrier 31 whereas the "area one" pixels lie above opaque regions of the barrier 31 and do not receive any light from the backlight 13. For example, the area two pixels may be those located at the edges of the screen whereas the area one pixels may be those located everywhere accept at the edge of the screen. Also, some of the slits of the barrier 31 forming the visual position indicator may be "removed" so as to be opaque and prevent transmission of light from the backlight 13 in order to provide a larger number of pixels to form the area one.

In the embodiments described hereinbefore, the first and second regions 33 and 34 are provided as spatially separate regions on the LCD 22. In an alternative set of embodiments, these regions may be defined temporally. In such embodiments, the screen 32 is unnecessary and is not therefore present. Instead, the controller 23 is arranged to switch the LCD 22, at least during a crosstalk-assessing mode, between two phases of operation. In the first phase, all of the pixels are lit at full brightness and the backlight 13 is switched off. In the second phase, all of the pixels are set to a brightness specified by the parameter A and the backlight 13 is switched on. Switching between states may be performed manually or automatically by the controller 23.

If the same spatial regions, such as the whole display area, are used for crosstalk indication during the two phases of operation, it is necessary to indicate when the display should be darker or of the same brightness in order that the observer can assess whether the level of crosstalk is acceptable for autostereoscopic viewing.

Alternatively, more limited regions may be used to provide the crosstalk indication, for example to allow the observer to assess the actual amount of crosstalk and to signal this to the display so that, for example, automatic crosstalk correction may be provided as described hereinbefore or the display may automatically switch from the autostereoscopic mode to, for example, the 2D mode.

The invention claimed is:

1. An autostereoscopic display comprising:
    a pixellated transflective spatial light modulator comprising at least one first region, at least one second region, and a plurality of pixels;
    a backlight;
    an arrangement for substantially preventing transmission of light through said at least one first region of said modulator to an autostereoscopic viewing region of said display; and a controller for setting at least some of said pixels of said at least one first region to a first predetermined transmissivity and for setting at least some of said pixels of said at least one second region of said modulator to a second predetermined transmissivity less than said first transmissivity, said controller being further arranged to set said at least some of said pixels of said at least one second region of said modulator to a transmissivity according to a user selected crosstalk level for assessing crosstalk due to a change in the amount of reflected light relative to transmitted light in conjunction with the transflective spatial light modulator by the appearance of said at least one first and second regions.

2. A display as claimed in claim 1, in which said arrangement comprises a screen for substantially preventing transmission of light from said backlight through said at least one first region.

3. A display as claimed in claim 2, comprising a parallax element between said modulator and said backlight, said screen comprising part of said parallax element.

4. A display as claimed in claim 1, in which said backlight comprises a first portion disposed behind said at least one first region and a second portion disposed behind said at least one second region, said arrangement being arranged to switch off said first portion independently of said second portion.

5. A display as claimed in claim 1, comprising a parallax element between said modulator and said backlight.

6. A display as claimed in claim 5, in which said parallax element comprises a parallax barrier.

7. A display as claimed in claim 1, in which said first transmissivity is substantially equal to a maximum transmissivity of said pixels.

8. A display as claimed in claim 1, in which said at least one second region comprises a plurality of second regions.

9. A display as claimed in claim 8, in which said controller is arranged to set said pixels of said different second regions to respective different second transmissivities.

10. A display as claimed in claim 9, in which said pixels of each said different second transmissivity form a pattern providing a visual representation of a crosstalk value corresponding to said different second transmissivity.

11. A display as claimed in claim 9, comprising a manually operable control for selecting any one of said different second transmissivities.

12. A display as claimed in claim 11, in which said controller is arranged to provide a crosstalk value corresponding to said selected second transmissivity.

13. A display as claimed in claim 12, in which said controller is arranged to perform a crosstalk correction of autostereoscopic image data for said modulator in accordance with said crosstalk value.

14. A display as claimed in claim 12, having a two dimensional operating mode and in which said controller is arranged to switch to said two dimensional mode when said crosstalk value exceeds a predetermined threshold.

15. A display as claimed in claim 1, having a two dimensional operational mode.

16. A display as claimed in claim 1, in which said controller is arranged to set said pixels of said at least one second region to any one of a plurality of different second transmissivities.

17. A display as claimed in claim 16, in which said pixels of each said different second transmissivity form a pattern providing a visual representation of a crosstalk value corresponding to said different second transmissivity.

18. A display as claimed in claim 16, comprising a manually operable control for selecting any one of said different second transmissivities.

19. A display as claimed in claim 18, in which said controller is arranged to provide a crosstalk value corresponding to said selected second transmissivity.

20. A display as claimed in claim 19, in which said controller is arranged to perform a crosstalk correction of autostereoscopic image data for said modulator in accordance with said crosstalk value.

21. A display as claimed in claim 19, having a two dimensional operational mode and in which said controller is arranged to switch to said two dimensional mode when said crosstalk value exceeds a predetermined threshold.

22. A display as claimed in claim 1, in which said at least some pixels of said first and second regions are of a same colour.

23. A display as claimed in claim 1, in which said modulator comprises a liquid crystal device.

24. An autostereoscopic display comprising:
a pixellated transflective spatial light modulator comprising at least one first region, at least one second region, and a plurality of pixels;
a backlight; and
a controller for alternately selecting first and second phases of operation, wherein, during said first phase, said controller sets at least some of said pixels of said at least one first region of said modulator to a first transmissivity and sets said backlight to supply light of a first intensity through at least some of said at least some pixels of said at least one first region, and wherein, during said second phase, said controller sets at least some of said pixels of said at least one second region of said modulator to a second transmissivity less than said first transmissivity and sets said backlight to supply light of a second intensity greater than said first intensity through at least some of said at least some pixels of said at least one second region, said controller being further arranged to set said at least some of said pixels of said at least one second region of said modulator to a transmissivity according to a user selected crosstalk level for assessing crosstalk due to a change in the amount of reflected light relative to transmitted light in conjunction with the transflective spatial light modulator by the appearance of said at least one first and second regions.

25. A display as claimed in claim 24, in which said at least one first region at least partially overlaps said at least one second region.

26. A display as claimed in claim 25, in which each of said at least one first region and said at least one second region comprises substantially a whole display area of said modulator.

27. A display as claimed in claim 24, in which said controller is arranged to switch automatically between said first and second phases.

28. A display as claimed in claim 24, comprising a manually operable control for switching between said first and second phases.

29. A display as claimed in claim 24, comprising a parallax element between said modulator and said backlight.

30. A display as claimed in claim 29, in which said parallax element comprises a parallax barrier.

31. A display as claimed in claim 24, in which said first transmissivity is substantially equal to a maximum transmissivity of said pixels.

32. A display as claimed in claim 24, in which said at least one second region comprises a plurality of second regions.

33. A display as claimed in claim 32, in which said controller is arranged to set said pixels of said second regions to respective different second transmissivities.

34. A display as claimed in claim 33, in which said pixels of each said different second transmissivity form a pattern providing a visual representation of a crosstalk value corresponding to said different second transmissivity.

35. A display as claimed in claim 33, comprising a manually operable control for selecting any one of said different second transmissivities.

36. A display as claimed in claim 35, in which said controller is arranged to provide a crosstalk value corresponding to said selected second transmissivity.

37. A display as claimed in claim 36, in which said controller is arranged to perform a crosstalk correction of autostereoscopic image data for said modulator in accordance with said crosstalk value.

38. A display as claimed in claim 36, having a two dimensional operating mode and in which said controller is arranged to switch to said two dimensional mode when said crosstalk value exceeds a predetermined threshold.

39. A display as claimed in claim 24, having a two dimensional operational mode.

40. A display as claimed in claim 24, in which said controller is arranged to set said pixels of said at least one second region to any one of a plurality of different second transmissivities.

41. A display as claimed in claim 40, in which said pixels of each said different second transmissivity form a pattern providing a visual representation of a crosstalk value corresponding to said different second transmissivity.

42. A display as claimed in claim 40, comprising a manually operable control for selecting any one of said different second transmissivities.

43. A display as claimed in claim 42, in which said controller is arranged to provide a crosstalk value corresponding to said selected second transmissivity.

44. A display as claimed in claim 43, in which said controller is arranged to perform a crosstalk correction of autostereoscopic image data for said modulator in accordance with said crosstalk value.

45. A display as claimed in claim 43, having a two dimensional operational mode and in which said controller is arranged to switch to said two dimensional mode when said crosstalk value exceeds a predetermined threshold.

46. A display as claimed in claim 24, in which said at least some pixels of said first and second regions are of a same colour.

47. A display as claimed in claim 24, in which said modulator comprises a liquid crystal device.

* * * * *